Inventor
Stewart Kerwin Hambling
By: Scrivener and Parker
Attorneys

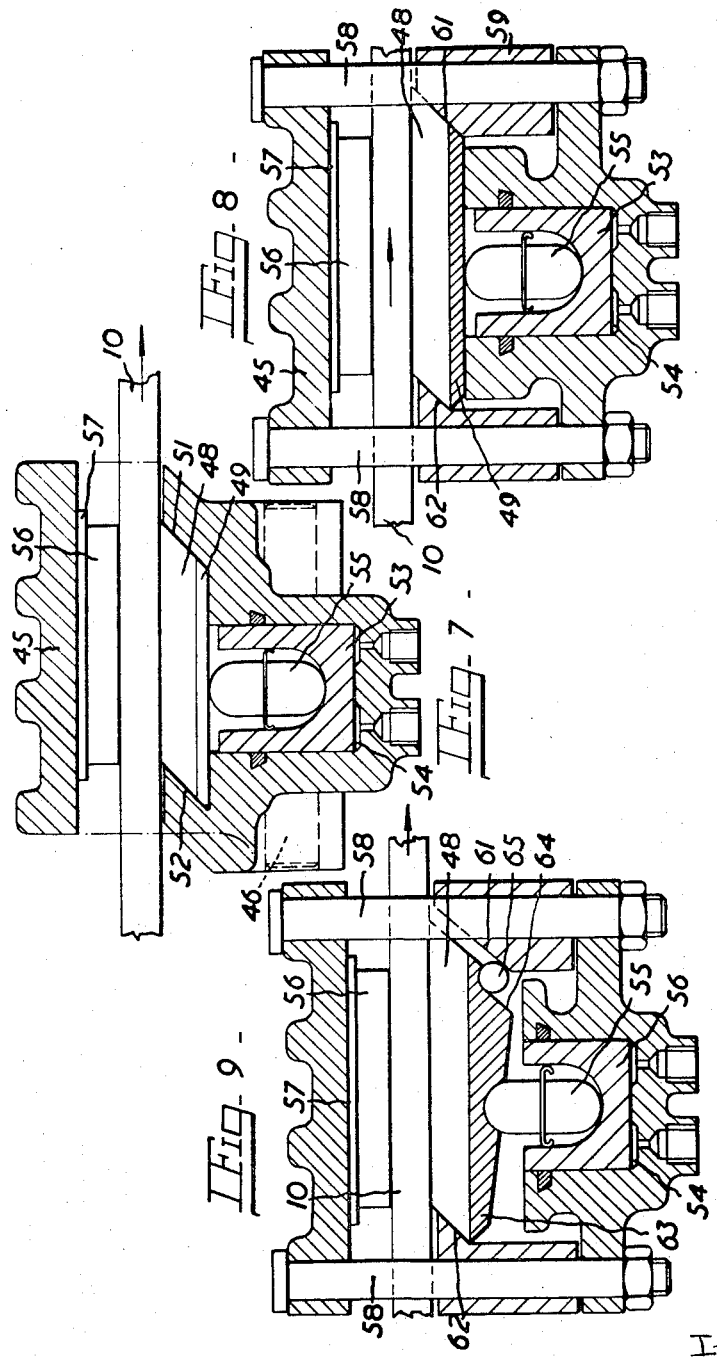

United States Patent Office 3,422,934
Patented Jan. 21, 1969

3,422,934
SPOT-TYPE DISC BRAKES
Stewart Kevern Hambling, Tamworth, England, assignor to Girling Limited, Tyseley, England, a British company
Continuation of application Ser. No. 277,240, May 1, 1963. This application Mar. 8, 1968, Ser. No. 711,809
U.S. Cl. 188—73    3 Claims
Int. Cl. F16d 55/00

ABSTRACT OF THE DISCLOSURE

This invention relates to improvements in disc brakes of the kind in which a directly actuated friction pad is adapted to be brought into engagement with one face of a rotatable disc by actuating means located in one limb of a caliper or housing which straddles a portion of the periphery of the disc, a friction pad located in or on the other limb of the caliper being brought into engagement with the opposite face of the disc by the reaction on the caliper. The friction pads and actuating means move in a direction inclined to the plane of the disc.

---

This is a continuation of application Ser. No. 277,240, filed May 1, 1963, now abandoned.

To allow for the relative axial movement between the caliper and the disc which is necessary where there is an applying means in one limb only of the caliper, the caliper may be mounted to slide in guides parallel to the axis of the disc, or it may be mounted to swing about an axis which is substantially at right angle to the axis of the disc and may intersect the axis of the disc or may be located at one end of the caliper and may be substantially parallel to a radius of the disc passing through the center of the circumferential length of the caliper.

According to our invention, in a disc brake of the kind set forth, the directly actuated friction pad is guided for movement towards and away from the disc in a direction which is inclined with respect to a line at right angles to the surface of the disc, the inclination being in such a direction that when the friction paid is applied to the disc the frictional engagement between the pad and the surface of the disc produces a servo or self-energising action which increases the retarding effect of the brake.

According to a further feature of our invention, the directly actuated friction pad is mounted on a carrier which is acted on by a piston working in a fluid pressure cylinder of which the axis is inclined forwardly with respect to the normal direction of rotation of the disc and the trailing end of the carrier co-operates with a correspondingly inclined abutment surface in the caliper or housing. When fluid under pressure is admitted to the cylinder, the force applied by the piston to the carrier has a component directed circumferentially in the direction of movement of the surface of the disc which urges the carrier into engagement with the inclined abutment which in turn applies to the carrier a force directed towards the disc. This effect is augmented by the tendency of the pad and carrier to be carried round with the disc so that the brake has a powerful servo or self-energising action.

A ball or roller, or two or more balls or rollers, may be arranged between the carrier and the inclined abutment surface to reduce friction.

In a modification the axis of the fluid pressure piston may be at right angles to the surface of the disc, a rocking dolly or thrust member being interposed between the piston and the carrier to permit circumferential movement of the carrier and friction pad relative to the disc.

According to a further feature of our invention the directly actuated pad is applied to the disc by a piston working in a fluid pressure cylinder of which the axis is inclined with respect to a line normal to the surface of the disc and the caliper or housing is formed in two parts of which the meeting faces lie in a plane substantially parallel to the axis of the cylinder and extend across the plane of the disc.

With this construction each part of the caliper or housing forms a solid bridge across the disc and provides maximum strength at the position where the minimum swept outline is desired.

Some disc brakes in accordance with our invention are illustrated by way of example in the accompanying drawings in which:

FIGURES 7, 8 and 9 are sections showing different forms of brake in which the actuated friction pad is applied to the disc by pistons working in fluid pressure cylinders of which the axes are at right angles to the face of the disc;

Figure 1:
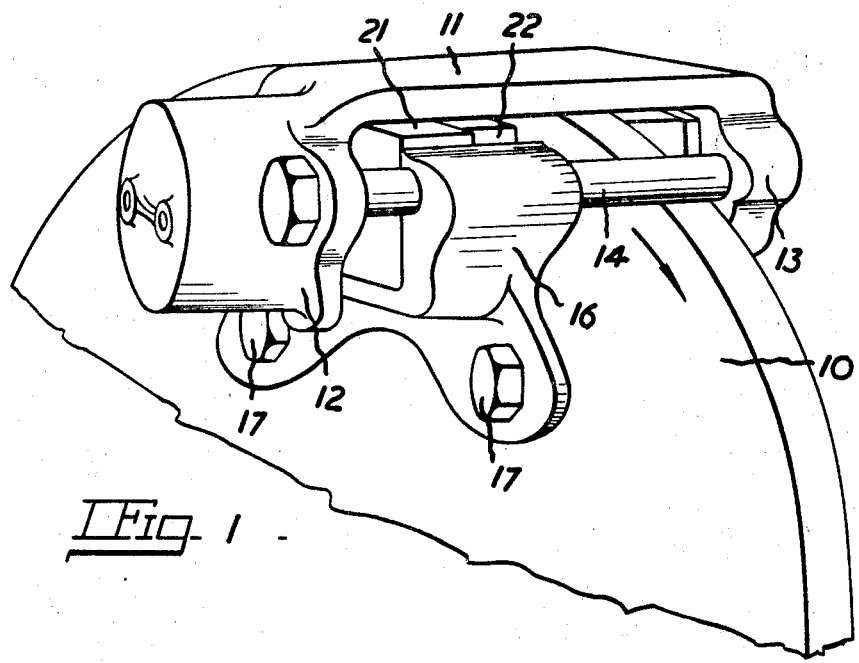
FIGURE 1 is a perspective view of one form of brake in which the caliper is mounted to slide in a direction parallel to the axis of the disc.
Figure 2:
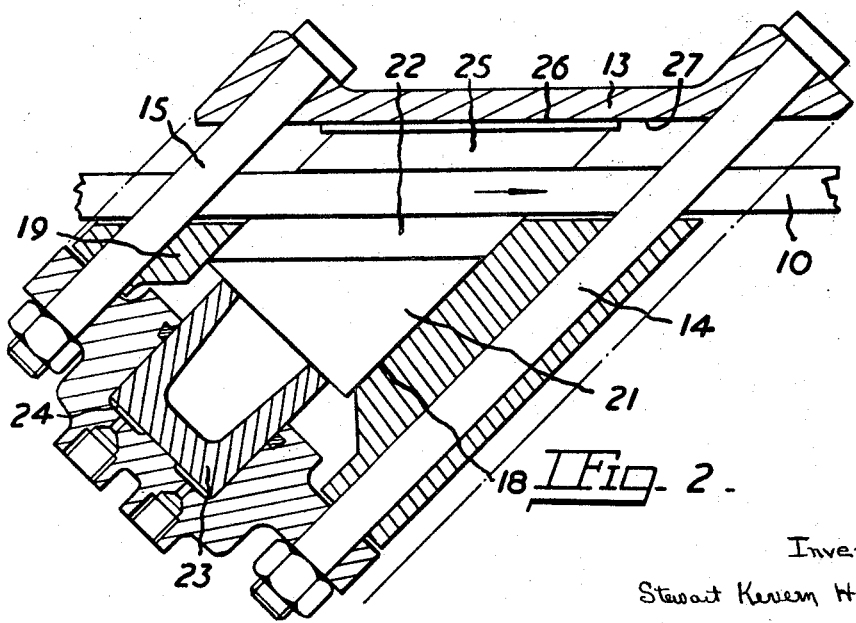
FIGURE 2 is a section of the brake shown in FIGURE 1 in a plane tangential to the disc.
Figure 10:
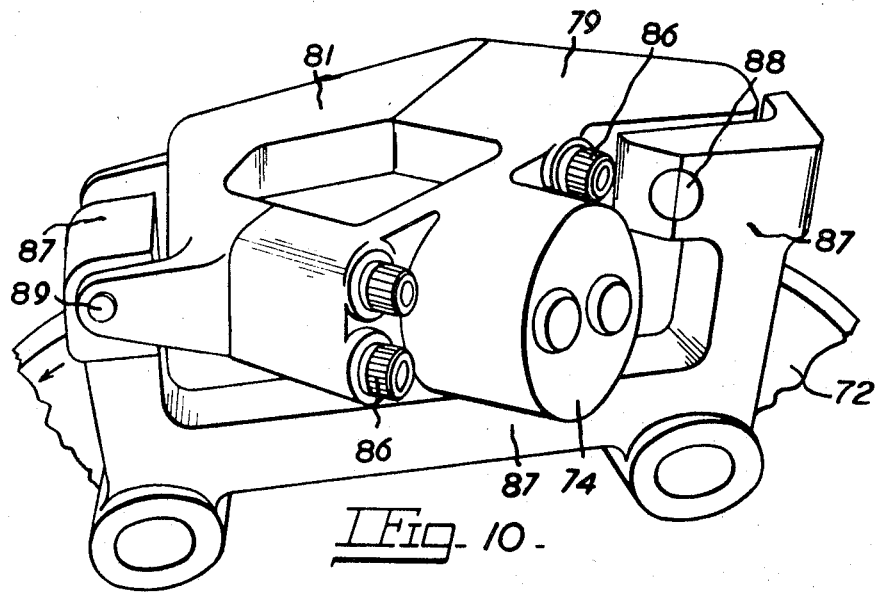
FIGURE 10 is a perspective view of another form of brake.

In the brake illustrated in FIGURES 1 and 2, 10 is the brake disc which is attached to and rotates with a wheel or other rotating part of a vehicle transmission (not shown).

The periphery of the disc is straddled by a caliper comprising a bridge piece 11 extending across the plane of the disc and two limbs 12, 13 extending radially inwards from the ends of the bridge piece on opposite sides of the disc. The caliper mounting comprises two circumferentially spaced parallel bolts 14, 15 extending between the limbs of the caliper outside the disc and slidably guided in bores in a bracket 16 rigidly secured by bolts 17 to a stationary member on one side of the disc. The axes of the bolts 14, 15 are inclined at an angle of about 45° to the plane of the disc. The bracket 16 provides two spaced, straight torque-taking abutment surfaces 18, 19 parallel to the axes of the bolts 14, 15, and slidably guided between these surfaces is a wedge-shaped block or carrier 21 carrying on its end face next to the disc a friction pad 22 for engagement with the adjacent face of the disc. The ends of the pad are inclined at the same angle as the abutment surfaces.

The outer end of the block 21 is at right angles to the abutment surfaces and is engaged by a piston 23 working in an hydraulic cylinder 24 which is located in the limb 12 of the caliper and of which the axis is parallel to the abutment surfaces.

A friction pad 25 adapted to engage the opposite face of the disc is bonded or otherwise secured to a backing place 26 detachably mounted on the inner face 27 of the limb 13 of the caliper.

When fluid under pressure is supplied to the outer end of the cylinder 24 the piston 23 acting through the block or carrier 21 applies the friction pad 22 to the adjacent face of the disc and the reaction on the caliper draws the friction pad 25 into engagement with the opposite face of the disc.

The force exerted by the piston on the friction pad 22 has a component in the direction of movement of the surface of the disc with which the pad engages, the disc being rotated in the direction indicated by the arrow, and the tendency of the pad to be carried round with the disc urges the block or carrier 21 into engagement with the inclined abutment 18 which exerts a force on the pad urging it towards the disc so that the brake has a powerful self-energising action.

Figure 3:
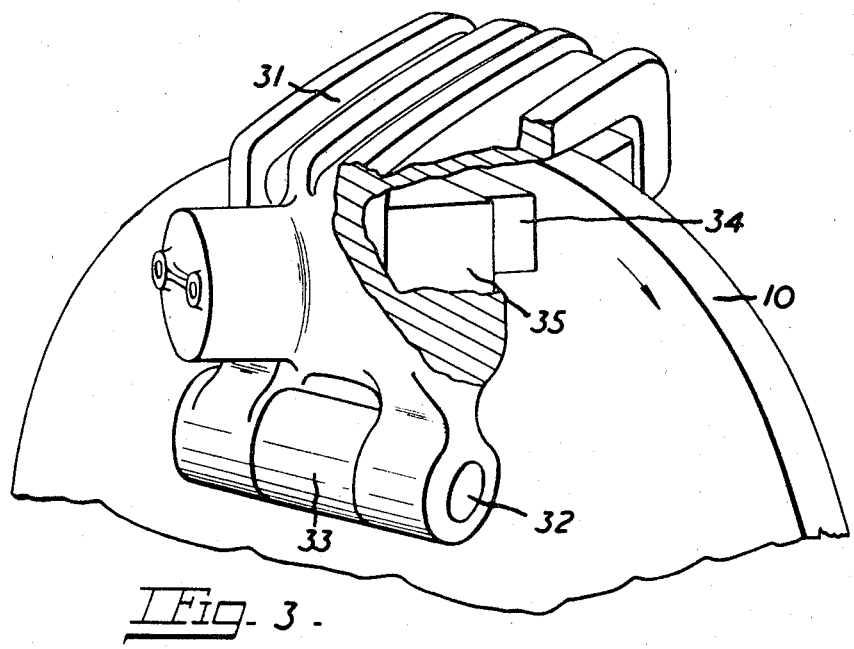
FIGURE 3 is a perspective view of a brake in which the caliper is mounted to swing about an axis substantially at right angles to the axis of the disc.
Figure 4:
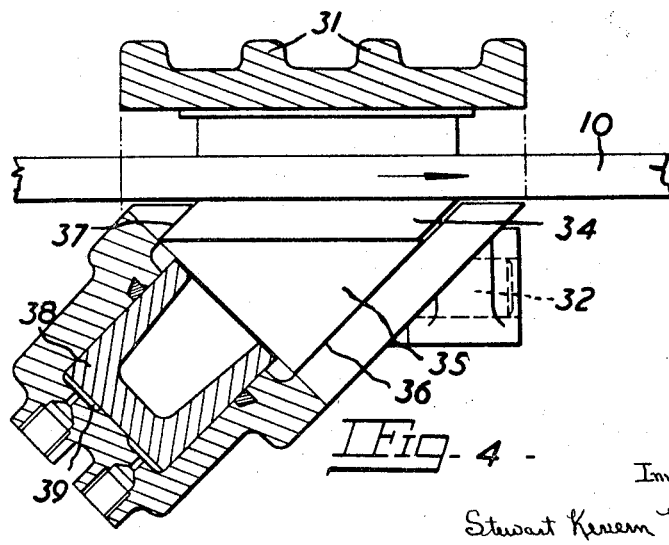
FIGURE 4 is a section of the brake shown in FIGURE 3 in a plane tangential to the disc.

In the brake shown in FIGURES 3 and 4, the caliper 31 instead of being mounted to slide relative to the disc is mounted to pivot or swing about a pin 32 in a fixed member 33 at one side of the disc, the axis of the pin being at right angles to but displaced radially outwards from the axis of the disc.

The directly actuated friction pad 34 is bonded or otherwise secured to a wedge-shaped block or carrier 35 which is guided between abutment surfaces 36 and 37 in the caliper, the abutment surfaces being parallel to each other and being inclined at an angle of about 45° to the plane of the disc. The pad is applied to the disc by a piston 38 working in a fluid pressure cylinder 39 of which the axis is parallel to the abutment surfaces, the piston acting on the pad through the carrier 35.

Figure 5:
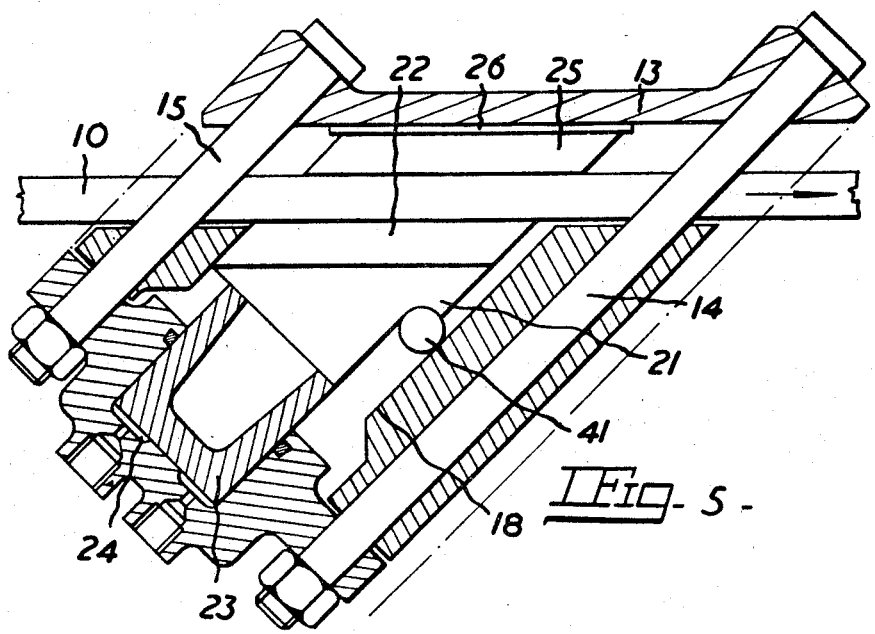
FIGURE 5 is a section similar to FIGURE 2 but showing a modification.

The brake shown in FIGURE 5 is similar to that illustrated in FIGURES 1 and 2 and the same reference numerals have been applied to corresponding parts, but a roller 41 is interposed between the abutment surface 18 which takes the torque when the brake is applied and the adjacent side of the carrier 21 which is cut away to accommodate the roller. There may be two or more rollers, the object of introducing the roller or rollers being to reduce friction between the carrier and the abutment surface. The friction pad 22 is bonded to the inner end of the carrier.

Figure 6:
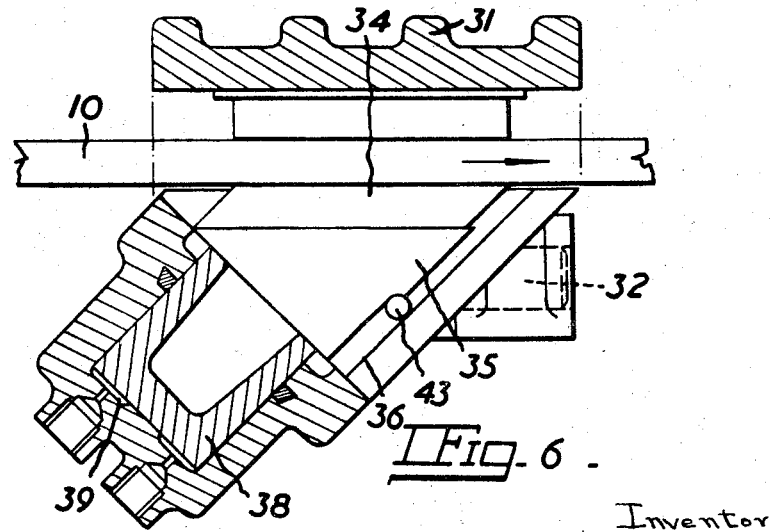
FIGURE 6 is a section similar to FIGURE 4 but showing a modification.

The brake shown in FIGURE 6 is similar to that illustrated in FIGURES 3 and 4 and the same reference numerals have been applied to corresponding parts, but a roller 43 is interposed between the block 35 and the abutment surface 36 to reduce friction.

In the brake shown in FIGURE 7, the caliper 45 is mounted to swing about a pin 46 in a stationary member at one side of the disc 10 which normally rotates in the direction indicated by the arrow. A directly actuated pad 48 is bonded to a rigid backing plate 49 and the ends of the pad and backing plate are parallel and inclined at an angle of about 45° to the plane of the disc. These ends engage with circumferentially spaced complementarily inclined abutment surfaces 51 and 52 in the caliper. The pad is applied to the disc by a piston 53 working in a fluid-pressure cylinder 54 which is located in the adjacent limb of the caliper and of which the axis is at right angles to the plane of the disc. The piston does not engage directly with the backing plate, but acts on it through a dolly or thrust member 55 of which the ends are in rocking engagement with the piston and backing plate.

This allows for the small circumferential movement of the friction pad and backing plate which takes place when the brake is applied, without imposing a side thrust on the piston. The other friction pad 56 is bonded to a backing plate 57 which is detachably secured to the inner face of the opposite limb of the caliper.

The brake shown in FIGURE 8 is similar to that illustrated in FIGURE 7, and the same reference numerals have been applied to corresponding parts, but the caliper instead of being pivoted carries circumferentially spaced bolts 58 of which the axes are at right angles to the plane of the disc, and the bolts are slidably guided in a stationary block or bracket 59 which provides torque-taking abutment surfaces 61 and 62 for the directly actuated friction pad 48 and its backing plate 49.

The brake shown in FIGURE 9 is similar to that illustrated in FIGURE 8 but the directly actuated friction pad 48 is bonded to a backing plate 63 which is of sufficient thickness to provide at the end towards which the pad moves when the brake is applied a recessed surface 64 parallel to the abutment surface 61, and a roller 65 is interposed between the surfaces 61 and 64.

Figure 11:
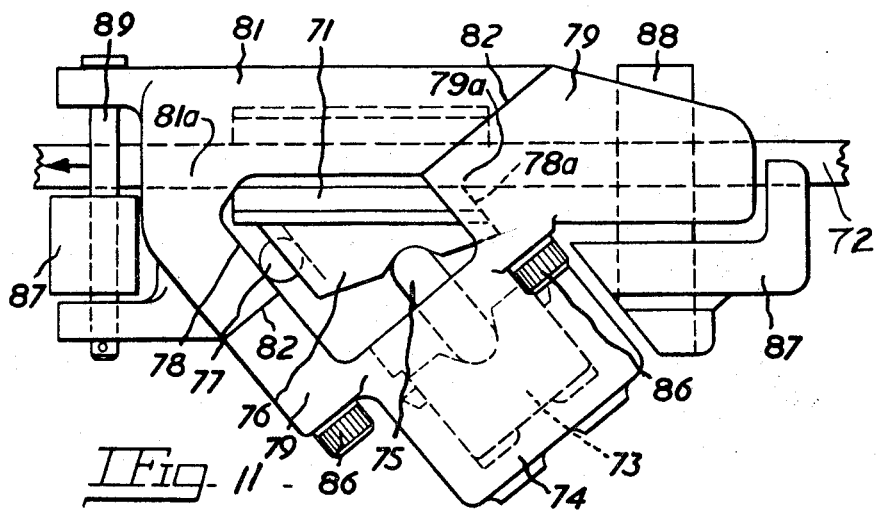
FIGURE 11 is a plan of the brake shown in FIGURE 10.

In the brake shown in FIGURES 10 and 11 the directly actuated friction pad 71 is applied to the disc 72 by a piston 73 working in an hydraulic cylinder 74 of which the axis is inclined at an angle to the plane of the disc. The piston acts on the friction pad through a rocking dolly or thrust member 75 and a backing plate or carrier 76 of which the trailing end is parallel to the axis of the cylinder, and a roller 77 is interposed between the end of the backing plate and a parallel abutment surface 78 in the caliper.

The caliper is formed in two parts, 79, 81 of which the meeting faces 82 lie in a plane substantially at right angles to the axis of the cylinder 74 and extend across the plane of the disc so that each part forms a rigid bridge 79a, 81a respectively, across the disc, the two parts being secured together by bolts 86 of which the axes are at right angles to the meeting faces. These bolts can be of less diameter or lower tensile strength than the bolts used in calipers of normal construction divided in the plane of the disc as they are subjected to lower stresses. It will be noted in FIG. 11 that with the described arrangement the roller 77 engages the abutment surface 78 entirely to one side of the meeting faces 82 whereas the opposite side of the friction pad 71 engages its guide surface 78a entirely on the opposite side of the meeting faces with each side of the pad being thus guided on the respective parts 79, 81 of the caliper.

The caliper is mounted to slide in a direction parallel to the axis of the disc on a stationary supporting member 87 adapted to be secured to a stationary part at one side of the disc. At one end the caliper slides on a pin 88 of substantial diameter mounted in the member 87 and at the other end the caliper carries a pin 89 which is slidable through a part of the member 87. The pin 88 takes the torque on the caliper when the brake is applied and the pin 89 locates the caliper against angular movement about the pin 88.

One important advantage of our invention is that the servo or self-energising action which is obtained with a single-sided caliper having an actuating means in one limb only of the caliper is equal to that obtainable with a double-sided caliper, and the single-sided construction has fewer parts and occupies less space so that it is easier to install.

Another advantage where the actuating means is hydraulic is that the hydraulic cylinder which, in a double-sided caliper, is on the outboard side of the disc and is shielded from cooling air is dispensed with so that there is less risk of trouble with vapourisation of the braking fluid.

I claim:

1. A disc brake comprising a rotatable disc, a caliper straddling a portion of the periphery of the disc, a stationary member adjacent to the disc and on which said caliper is mounted for movement in an axial direction relative to the disc, first and second friction pads for engagement with opposite faces of the disc located in the caliper, guide means in a limb of said caliper and engaged by said first friction pad to positively limit the movement of said pad towards and away from said disc along a straight line defined by said guide means, said guide means comprising spaced rigid parallel torque taking abutments on said limb of the caliper engaging correspondingly spaced abutment parts on said first friction pad, said abutments being inclined to a line normal to the surface of the disc and arranged so that the first pad is guided towards the disc in the same direction as the rotation thereof, and is prevented by said guide means from moving with said disc, upon engagement therewith, circumferentially beyond the straight line established by said guide means, and means for applying said first friction pad to the disc comprising a fluid-pressure cylinder in the caliper, the axis of the cylinder being inclined with respect to a line normal to the surface of the disc, and a piston working in the cylinder and acting on the friction pad, said caliper being formed in two parts which are secured together and have their meeting faces in a plane at right angles to the axis of the cylinder, each part being constructed and arranged to form a bridge extending across the plane of the disc.

2. The disc brake in accordance with claim 1 wherein the line of said meeting faces is positioned so that one side of said first friction pad engages one of said caliper parts exclusively to one side of said line of said meeting faces and the other side of said pad engages the other of the said caliper parts exclusively on the opposite side of said meeting faces.

3. A disc brake comprising a rotatable disc, a caliper straddling a portion of the periphery of the disc, a stationary member adjacent to the disc on which said caliper is mounted for sliding movement in a direction at right angles to the plane of the disc, first and second friction pads for engagement with opposite faces of the disc located in the caliper, guide means in a limb of said caliper and engaged by said first friction pad to positively limit the movement of said pad towards and away from said disc along a straight line defined by said guide means, said guide means comprising spaced rigid parallel torque taking abutments on said limb of the caliper engaging correspondingly spaced abutment parts on said first friction pad, said abutments being inclined to a line normal to the surface of the disc and arranged so that the first pad is guided towards the disc in the same direction as the rotation thereof, and is prevented by said guide means from moving with said disc, upon engagement therewith, circumferentially beyond the straight line established by said guide means, a fluid-pressure cylinder in the caliper of which the axis is parallel to said guide means, and a piston working in the cylinder and acting on the friction pad, said second friction pad being applied to the opposite side of the disc by the reaction on the caliper when fluid under pressure is supplied to the cylinder, said caliper being formed in two parts which are secured together and have their mating faces in a plane at right angles to the axis of the cylinder.

References Cited
UNITED STATES PATENTS
2,957,553 10/1960 Chouings et al. _____ 188—23

FOREIGN PATENTS
1,019,873 11/1957 Germany.
788,841 1/1958 Great Britain.
829,866 3/1960 Great Britain.

GEORGE E. A. HALVOSA, *Primary Examiner.*